United States Patent
Sugawara et al.

(10) Patent No.: US 6,724,855 B2
(45) Date of Patent: Apr. 20, 2004

(54) X-RAY FLAT PANEL DETECTOR

(75) Inventors: Yasuhiro Sugawara, Nasu-gun (JP); Takayuki Tomisaki, Otawara (JP); Manabu Tanaka, Nasu-gun (JP); Akira Tsukamoto, Otawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 10/127,758

(22) Filed: Apr. 23, 2002

(65) Prior Publication Data

US 2002/0153491 A1 Oct. 24, 2002

(30) Foreign Application Priority Data

Apr. 23, 2001 (JP) ........................ 2001-124682
Apr. 19, 2002 (JP) ........................ 2002-117602

(51) Int. Cl.⁷ .......................... G21K 4/00; H05G 1/60; G03B 42/02; G03C 5/16
(52) U.S. Cl. .................... 378/19; 378/98; 378/98.8; 378/167; 378/189; 378/207; 250/206; 250/206.1; 250/206.2; 250/206.3; 250/580; 250/591; 257/546
(58) Field of Search ............... 250/206, 206.1, 250/206.2, 206.3, 580, 591, 370.09, 370.14, 361 R; 348/294; 378/19, 98, 98.8, 167, 189; 438/56

(56) References Cited

U.S. PATENT DOCUMENTS

| 5,818,898 A | | 10/1998 | Tsukamoto et al. | |
|---|---|---|---|---|
| 5,852,296 A | * | 12/1998 | Tsukamoto et al. | 250/370.09 |
| 6,044,128 A | * | 3/2000 | Tanaka et al. | 378/98.8 |
| 6,185,274 B1 | * | 2/2001 | Kinno et al. | 378/98.8 |
| 6,225,632 B1 | | 5/2001 | Kinno et al. | |
| 6,323,490 B1 | * | 11/2001 | Ikeda et al. | 250/370.09 |
| 6,353,229 B1 | * | 3/2002 | Polischuk et al. | 250/370.14 |
| 6,507,026 B2 | * | 1/2003 | Ikeda et al. | 250/370.09 |
| 6,607,935 B2 | * | 8/2003 | Kwon | 438/56 |
| 2001/0008271 A1 | * | 7/2001 | Ikeda et al. | 250/370.09 |
| 2003/0146990 A1 | * | 8/2003 | Tsukamoto et al. | 348/294 |

* cited by examiner

Primary Examiner—John R. Lee
Assistant Examiner—Mary El-Shammaa
(74) Attorney, Agent, or Firm—Oblon, Spivak, McClelland, Maier & Neustadt, P.C.

(57) ABSTRACT

An X-ray flat panel detector includes sensor elements constituted by a plurality of effective pixels that detect X-rays and a plurality of dummy pixels that are arranged adjacent to the effective pixel area and generate electrical signals irrelevant to X-rays, signal lines which read out electrical signals from the respective pixels, scanning lines which scan the respective pixels, a first electrostatic wiring line which distributes static electricity accumulated in the signal lines, and a second electrostatic wiring line which distributes static electricity accumulated in the scanning lines. A plurality of dummy pixels are classified into a DA area where noise superposed on the signal lines are removed and a DB area where noise superposed on the scanning lines are removed. The first and second electrostatic wiring lines are laid out around the sensor elements, and physically disconnected between the DA area and the DB area.

20 Claims, 16 Drawing Sheets

X-RAY FLAT PANEL DETECTOR

CROSS-REFERENCE TO RELATED APPLICATIONS

This application is based upon and claims the benefit of priority from the prior Japanese Patent Applications No. 2001-124682, filed Apr. 23, 2001; and No. 2002-117602, filed Apr. 19, 2002, the entire contents of both of which are incorporated herein by reference.

BACKGROUND OF THE INVENTION

1. Field of the Invention

The present invention relates to an X-ray flat panel detector used in an X-ray diagnostic system.

2. Description of the Related Art

An X-ray flat panel detector is an X-ray detector used in an X-ray diagnostic system which displays as a halftone image the intensity of X-rays having passed through the body of an object to be examined. X-ray flat panel detectors are recently being put into practical use in place of I.I. (Image Intensifier) and an imaging plate which have conventionally been used. X-ray flat panel detectors can be classified into a direct conversion type and indirect conversion type depending on an incident X-ray conversion method. X-ray detection and read arrangements of the respective types are as follows.

In the direct conversion method, incident X-rays are converted into electron-hole pairs by a photoelectric conversion film. The converted electron-hole pairs are supplied as charges by an externally applied high electric field to pixel electrodes arrayed in a matrix. The electron-hole pairs are accumulated in the pixel electrodes. The accumulated charges are sequentially read out as electrical signals to an integrating amplifier via a signal line under the control of switching elements (TFTs) (scanning lines are driven from an OFF potential to an ON potential). The readout signals are A/D-converted into image data, which is output to a subsequent processing system.

In the indirect conversion method, incident X-rays are temporarily converted into light by a phosphor, and the light is converted into electron-hole pairs by a photoelectric conversion film. The generated charges are supplied by an externally applied high electric field to pixel electrodes arrayed in a matrix. The charges supplied to the pixel electrodes are processed similarly to the direct conversion method, generating image data.

In general, the X-ray flat panel detector has effective pixels for acquiring diagnostic image data, and a pixel group for removing noise components from signals detected by the effective pixels. Pixels which constitute the pixel group are called dummy pixels. The dummy pixels are used to remove noise components generated when the potential of a scanning line which forms a capacitance (parasitic capacitance) together with a signal line changes and charges which depend on the potential change flow into the signal line. Each dummy pixel is covered with a protective electrode for preventing dielectric breakdown caused by application of a high electric field.

The protective electrode formed on the dummy pixel forms a capacitance together with the signal line or scanning line connected to the dummy pixel. When the dummy pixel is driven, the potential of the protective electrode is distributed on the surface and becomes unstable. The unstable potential of the protective electrode is transferred to the signal line of the dummy pixel and superposed as a noise component on the signal line. The effective pixel area is not influenced by the unstable potential of the protective electrode. For this reason, the output values of the effective pixel and dummy pixel differ from each other in the absence of X-rays. This difference may act as an offset within the output range of an A/D converter.

The X-ray flat panel detector has a wiring line for static protection in a switching element array (TFT array) manufacturing process (antistatic wiring line will be called an "LC wiring line" hereinafter). The LC wiring line is not necessary in the use of the X-ray flat panel detector, but is generally left without removing it. However, the LC wiring line forms a conductive path: scanning line for driving the dummy pixel→the dummy pixel→LC wiring line→the effective pixel→scanning line for driving the effective pixel. When the dummy pixel is driven in actual X-ray detection, the fluctuation component of the scanning line potential of the dummy pixel is superposed on the potential of each scanning line of each effective pixel via this conductive path, increasing noise.

BRIEF SUMMARY OF THE INVENTION

It is an object of the present invention to provide an X-ray flat panel detector capable of acquiring a low-noise, high-quality X-ray diagnostic image.

According to the first aspect of the present invention, there is provided an X-ray flat panel detector comprising an effective pixel array in which a plurality of pixel electrodes are arrayed in a matrix and accumulate charges, a photoconductor which covers the effective pixel array and generates charges on the basis of incident X-rays, a bias electrode which is formed on a second surface of the photoconductor, covers an area of the pixel electrodes, and applies a bias voltage between the photoconductor and the pixel electrodes, a plurality of signal lines to read out electronic signals from the effective pixel array, a plurality of scanning lines to scan the effective pixel array, first dummy pixels which are arranged adjacent to the effective pixel array and remove noise superposed on the plurality of signal lines, second dummy pixels which are arranged adjacent to the effective pixel array and remove noise superposed on the plurality of scanning lines, a first protective electrode which is arranged in correspondence with the first dummy pixels and electrically shields the bias electrode and the plurality of signal lines or the plurality of scanning lines, and a second protective electrode which is arranged in correspondence with the second dummy pixels, disconnected from the first protective electrode and electrically shields the bias electrode and the plurality of signal lines or the plurality of scanning lines.

According to the second aspect of the present invention, there is provided an X-ray flat panel detector comprising an effective pixel array in which a plurality of pixel electrodes are arrayed in a matrix and accumulate charges, a photoconductor which covers the effective pixel array and generates charges on the basis of incident X-rays, a bias electrode which is formed on a second surface of the photoconductor, covers an area of the pixel electrodes, and applies a bias voltage between the photoconductor and the pixel electrodes, a plurality of signal lines to read out electronic signals from the effective pixel array, a plurality of scanning lines to scan the effective pixel array, first dummy pixels which are arranged adjacent to the effective pixel array and remove noise superposed on the plurality of signal lines, second dummy pixels which are arranged adjacent to the effective pixel array and remove noise superposed on the plurality of scanning lines, and a protective electrode which is formed in such a way to deviate from a position facing to at least either the first dummy pixels or the second dummy pixels and electrically shields the bias electrode and the plurality of signal lines or the plurality of scanning lines.

According to the third aspect of the present invention, there is provided an X-ray flat panel detector comprising an effective pixel array in which a plurality of pixel electrodes are arrayed in a matrix and accumulate charges, a photoconductor which covers the effective pixel array and generates charges on the basis of incident X-rays, a plurality of first signal lines to read out electronic signals from the effective pixel array, a plurality of first scanning lines to scan the effective pixel array, and an electrostatic dispersion wiring line which is connected directly or via a nonlinear element to at least one of the plurality of first signal lines and at least one of the plurality of first scanning lines, and distributes static electricity accumulated in at least one of the plurality of first signal lines or the plurality of first scanning lines, wherein the electrostatic dispersion wiring line has a first auxiliary wiring line to disconnect the electrostatic dispersion wiring line between a connecting portion between the electrostatic dispersion wiring line and at least one of the plurality of first signal lines and a connecting portion between the electrostatic dispersion wiring line and at least one of the first scanning lines.

According to the fourth aspect of the present invention, there is provided an X-ray flat panel detector comprising an effective pixel array in which a plurality of pixel electrodes are arrayed in a matrix and accumulate charges, a photoconductor which covers the effective pixel array and generates charges on the basis of incident X-rays, a plurality of first signal lines to read out electronic signals from the effective pixel array, a plurality of first scanning lines to scan the effective pixel array, an electrostatic dispersion wiring line which is connected directly or via a nonlinear element to at least one of the plurality of first signal lines and at least one of the plurality of first scanning lines, and distributes static electricity accumulated in at least one of the plurality of first signal lines or the plurality of first scanning lines, first dummy pixels which remove noise superposed on the plurality of signal lines, second dummy pixels which remove noise superposed on the plurality of scanning lines, a plurality of second signal lines to read out electronic signals from the first dummy pixels, and second scanning lines to scan the second dummy pixels, wherein the electrostatic dispersion wiring line has a first wiring line which is connected to at least one of the plurality of first signal lines and at least one of the plurality of second signal lines, a second wiring line which is connected to at least one of the plurality of first scanning lines, and a third wiring line which is connected to at least one of the plurality of second scanning lines.

DETAILED DESCRIPTION OF THE INVENTION

Figure 1:
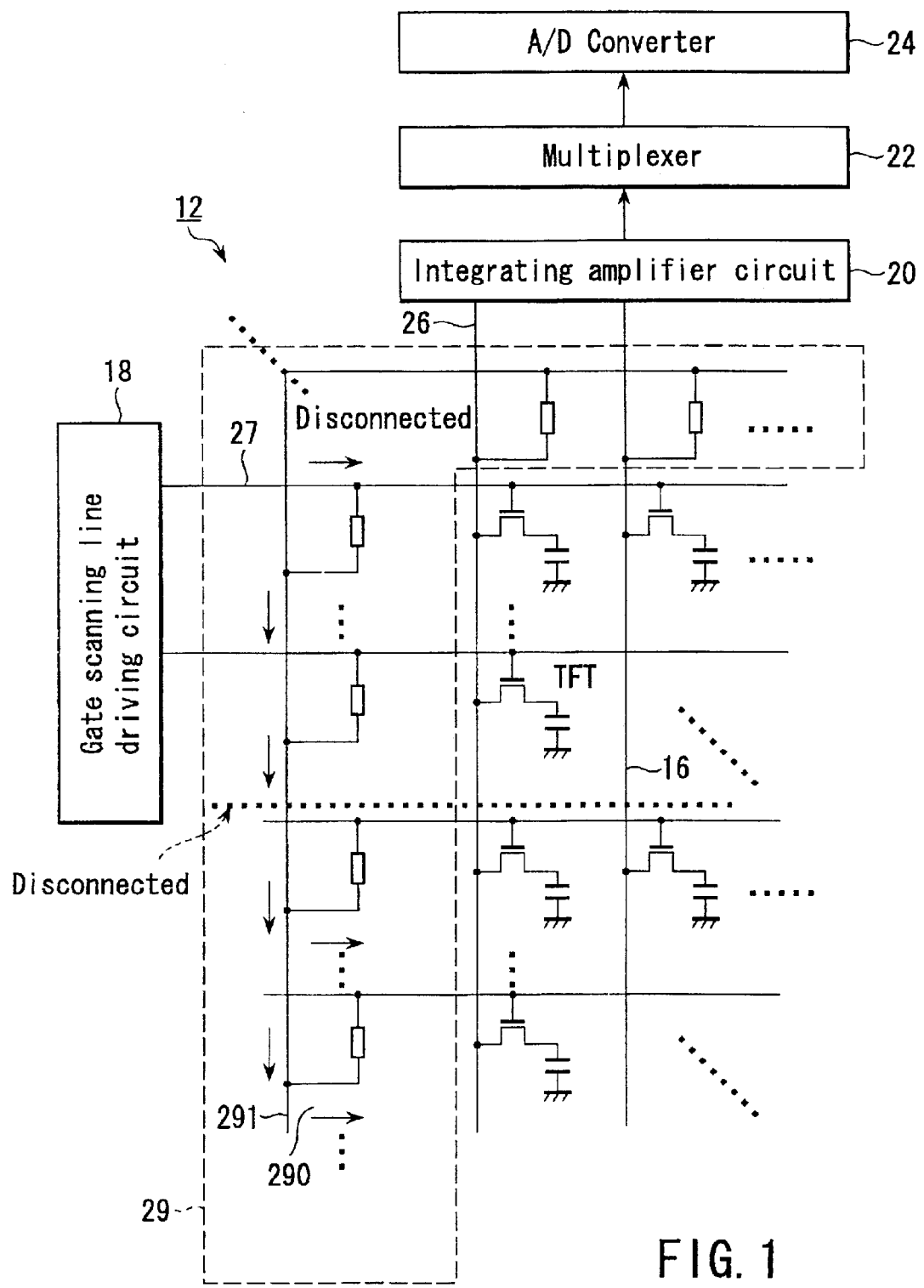
FIG. 1 is a diagram for explaining the schematic arrangement of an X-ray flat panel detector 12 according to an embodiment.

The first to third embodiments of the present invention will be described below with reference to the several views of the accompanying drawing.

First Embodiment

The first embodiment of the present invention will be described below with reference to the several views of the accompanying drawing. In the following description, the same reference numerals denote the same functions and parts throughout the drawing, and a repetitive description thereof will be omitted.

The schematic arrangement of an X-ray flat panel detector according to the first embodiment of the present invention will be described with reference to FIG. 1. FIG. 1 is a diagram for explaining the schematic arrangement of an X-ray flat panel detector 12 according to the first embodiment.

The X-ray flat panel detector 12 comprises X-ray sensor elements 16 for detecting incident X-rays, a gate scanning line driving circuit 18, an integrating amplifier circuit 20, a multiplexer 22, and an A/D converter 24.

The X-ray sensor elements 16 have a plurality of photoelectric conversion films (not shown) which are arrayed in a matrix and convert incident X-rays into charge information, pixel electrodes which are arranged in respective pixels and acquire charges from the photoelectric conversion films, a plurality of capacitors in which the charges acquired by the pixel electrodes are accumulated, and switching elements (e.g., TFTs: Thin Film Transistors) which read out the charges accumulated in the capacitors as electrical signals on the basis of a control signal from the gate scanning line driving circuit 18. The plurality of X-ray sensor elements 16 are arrayed in a two-dimensional matrix to form a sensor element array. As will be described later, the X-ray sensor elements 16 are classified into effective pixels, dummy pixels A (to be referred to as "DAs" hereinafter), and dummy pixels B (to be referred to as "DBs" hereinafter) (see FIG. 2).

The gate scanning line driving circuit 18 is electrically connected to the gate terminal of the switching element of each X-ray sensor element 16 via a corresponding gate scanning line 27. The gate scanning line driving circuit 18 supplies a control signal to the gate terminal of each switching element to ON/OFF-control switching elements on each gate scanning line 27. The gate scanning line driving circuit 18 may have a scanning line driving IC which is connected to each scanning line and has a function of supplying a potential to a protective electrode. In FIG. 1, the gate scanning line driving circuit 18 is formed on only one side. Alternatively, the gate scanning line driving circuits 18 may be arranged on two sides via the sensor element array to supply driving signals to the switching elements from the two sides.

The integrating amplifier circuit 20 amplifies the electrical signals of pixels on the same column that are read out from the X-ray sensor elements 16 via a corresponding signal line 26 every column at a predetermined timing.

The multiplexer 22 sequentially selects signals amplified by the integrating amplifier 20, and sends them to the subsequent A/D converter 24.

The A/D converter 24 converts an analog signal input from the multiplexer 22 into a digital signal.

In FIG. 1, the integrating amplifier circuit 20 and multiplexer 22 are arranged on only one side. Alternatively, the integrating amplifier circuits 20 and multiplexers 22 may be arranged on two sides via the sensor element array to read out the detection signals of the sensor elements from the two sides.

The effective pixel, dummy pixel A (DA), and dummy pixel B (DB) of the X-ray flat panel detector 12 will be explained with reference to FIG. 2.

Figure 2:
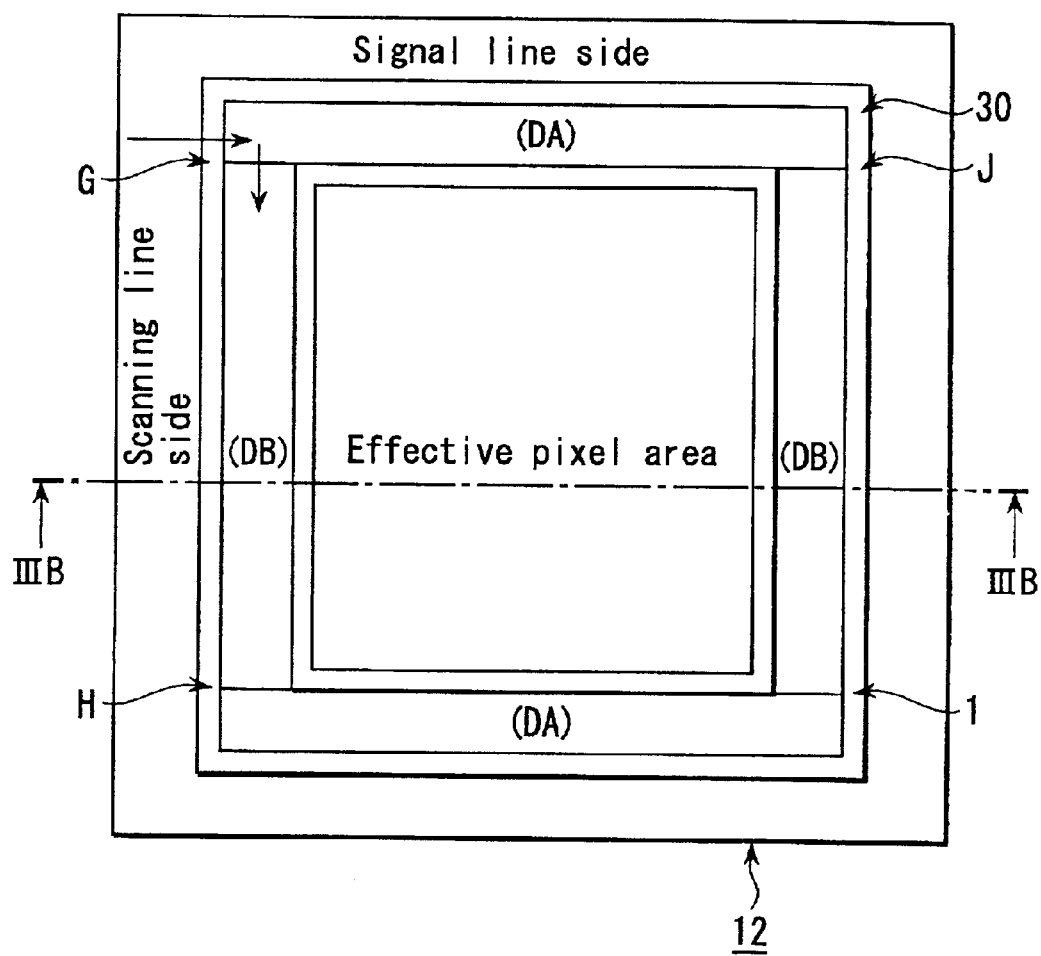
FIG. 2 is a plan view showing pixel areas formed by respective pixels when X-ray sensor elements 16 are classified into effective pixels, dummy pixels A (DA), and dummy pixels B (DB)

FIG. 2 is a plan view showing pixel areas formed by respective pixels when the X-ray sensor elements 16 are classified into effective pixels, dummy pixels A (DA), and dummy pixels B (DB). Areas where the respective pixels are distributed will be called an effective pixel area, dummy pixel A area, and dummy pixel B area. As described above, pixels which constitute each pixel area are formed from the sensor elements 16.

The effective pixels are pixels for detecting incident X-rays. An X-ray diagnostic image is generated based on X-rays detected by these pixels.

DAs are pixels arranged above and below the effective pixel area in the column direction (direction parallel to the signal line), as shown in FIG. 2, in order to cancel noise (NA) which flows into the signal line 26 and is superposed on the detection signals of the effective pixels when the gate scanning line driving circuit 18 changes the potential of the scanning line 27. A DA has a structure in which no charge information based on X-rays is accumulated (e.g., a photoelectric conversion film and capacitor are not electrically connected, the surface (X-ray incident side) is covered with a shield, or the like). Charges detected from the DA when TFT is changed from the OFF state to the ON state are only extracted noise (NA). Removal of noise (NA) from the effective pixel by using the DA is executed as follows. That is, in driving the scanning line of the effective pixel, the scanning line of the DA is driven with a phase opposite to that of the scanning line of the effective pixel. Then, noise (NA) with an opposite sign as that of the effective pixel is generated to cancel noise (NA) superposed on the detection signal.

DBs are pixels arranged on the right and left sides of the effective pixel area in the row direction (direction parallel to the scanning line), as shown in FIG. 2, in order to remove noise (NB) which is generated by fluctuations in the potential of the scanning line 27 in a steady state and is superposed on the detection signal of the effective pixel. A DB has a structure in which no charge information based on X-rays is accumulated (e.g., a photoelectric conversion film and capacitor are not electrically connected, the surface (X-ray incident side) is covered with a shield, or the like). According to a method of removing noise (NB) by the DB, the output value of the dummy pixel (DB) is subtracted from the output value of the effective pixel on the same gate line after irradiation of X-rays to remove the fluctuation component of the scanning line potential. The dummy pixel (DB) is so designed as to to have the same output value as that in the absence of X-rays incident on the effective pixel.

Function of Preventing Dielectric Breakdown Caused by Application of High Electric Field The function of the X-ray flat panel detector 12 for preventing dielectric breakdown caused by application of a high electric field will be explained.

Generally in X-ray diagnosis, a high electric field is applied to the X-ray flat panel detector in order to acquire charges generated in the photoelectric conversion film to the pixel electrode. The applied high electric field may cause dielectric breakdown in the effective pixel area and peripheral areas (dummy pixel A area, dummy pixel B area, scanning line area around the effective pixels, and signal line area around the effective pixels). A measure against dielectric breakdown is adopted in each area.

In the effective pixel area, a high electric field is applied within the photoelectric conversion film. If a large number of X-rays are incident on the photoelectric conversion film, a transient large current is generated to excessively increase the pixel potential. At this time, dielectric breakdown may occur between the effective pixel and a common electrode (capacitance is formed between them) or in the TFT. To prevent dielectric breakdown in the effective pixel area, the pixel is equipped with a function of externally removing charges when charges are excessively accumulated in the pixel. This function can be realized by, e.g., giving the TFT a diode function within the pixel.

Also in the peripheral area, a high electric field is so applied as to sufficiently enhance the characteristics of the photoelectric conversion film. Application of the high electric field may cause dielectric breakdown between a high-electric-field applying electrode, the dummy pixel, the scanning line, and the signal line. To prevent dielectric breakdown in the peripheral area, a protective electrode (potential: GND) for shielding charging by an insulating film is formed between the scanning line, the signal line, and the high-electric-field applying electrode in the X-ray flat panel detector. The protective electrode is made of a material having an electrical resistance.

Figure 3A:
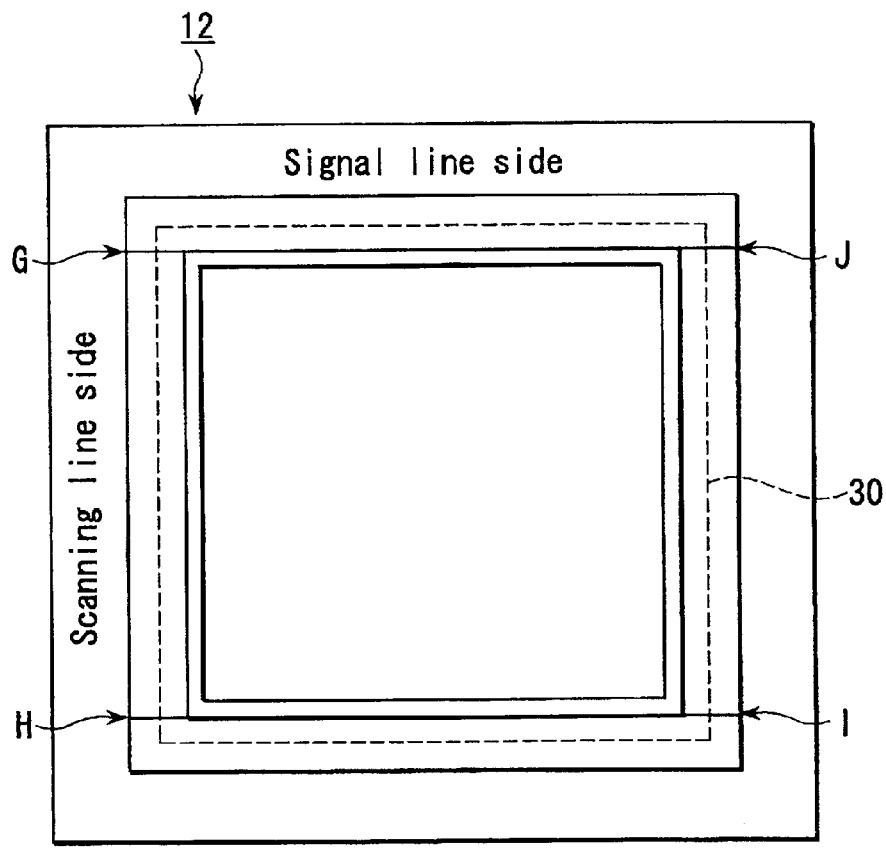
FIG. 3A is a plan view of the X-ray flat panel detector 12 for explaining a protective electrode 30.
Figure 3B:
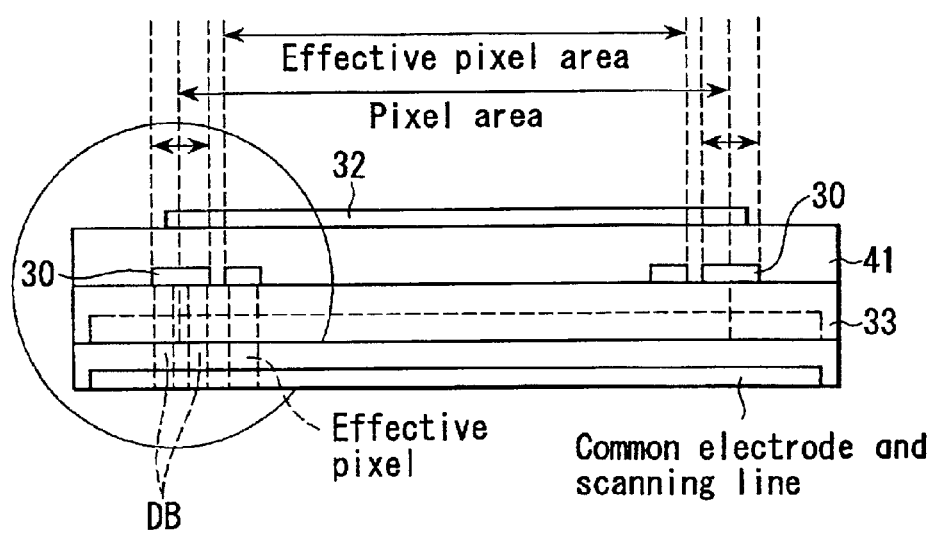
FIG. 3B is a sectional view of the X-ray flat panel detector 12 for explaining the protective electrode 30.
Figure 4:
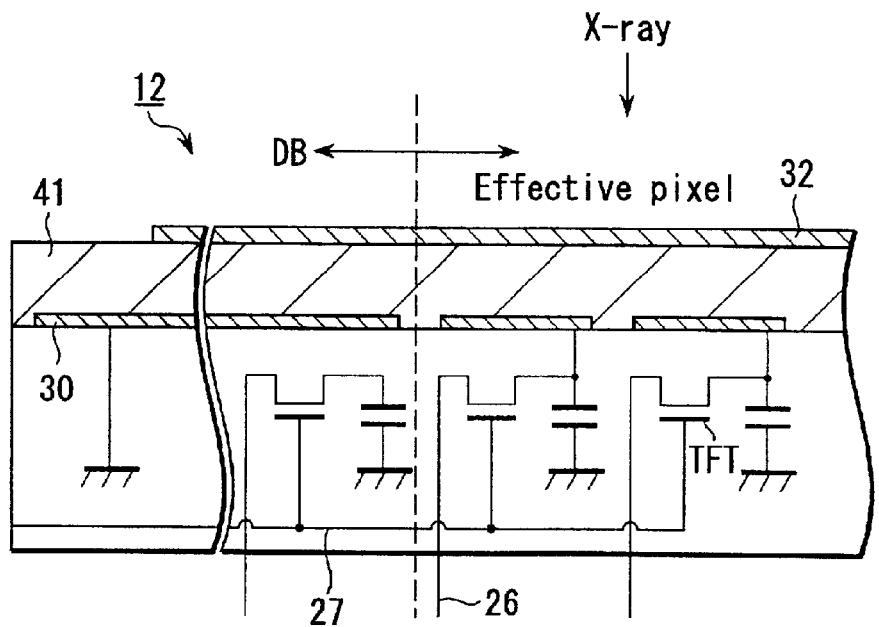
FIG. 4 is an enlarged view showing the inside of the circle in FIGS. 3A and 3B.

FIGS. 3A and 3B are views for explaining a protective electrode 30 of the X-ray flat panel detector 12, and are sectional views taken along the line D—D in FIG. 2. FIG. 4 is an enlarged view showing the inside of the circle in FIG. 3B. As shown in FIGS. 3A, 3B, and 4, the protective electrode 30 is formed between a high-voltage electrode 32 and a signal line layer 33. The protective electrode 30 is formed in correspondence with the dummy pixel A or B, as described above. Thus, the protective electrode 30 exists around the effective pixel area.

The protective electrode 30 is electrically divided between the effective pixel area and the dummy pixel A area, and between the effective pixel area and the dummy pixel B area (see FIGS. 3A, 3B, and 4). Further, the protective electrode 30 is also divided at G, H, I, and J between the dummy pixel A area and the dummy pixel B area. The purpose of this structure is not to transmit potential variations generated upon driving DA to the signal line 26 connected to the DB.

More specifically, the protective electrode 30 forms capacitances together with all the signal lines 26 connected to DAs or DBs due to the structure of the X-ray flat panel detector. All the scanning lines 27 connected to DAs or DBs form capacitances together with the protective electrode 30. If a DA is driven by the gate scanning line driving circuit 18, the protective electrode 30 flows a transient current which depends on potential changes. Since the protective electrode 30 is made of a material having a resistance component, the potential of the protective electrode 30 becomes unstable. Especially when the protective electrode 30 is not divided between the dummy pixel A area and the dummy pixel B area, the unstable potential of the protective electrode 30 transfers to the signal line of the DB and is superposed as a noise component on the signal line. On the other hand, the effective pixel area is not influenced by driving of the DA because the protective electrode covers only the dummy pixels. As a result, the output values of the effective pixel and dummy pixel differ from each other in dark imaging. This difference acts as an offset within the output range of the A/D converter, and generates noise in an X-ray diagnostic image.

To the contrary, the protective electrode 30 of the X-ray flat panel detector is divided between the dummy pixel A area and the dummy pixel B area, and can prevent noise from flowing. This is because a transient current flowing through the protective electrode 30 which covers the DA upon driving the gate scanning line is not superposed on the signal line via the protective electrode 30 which covers the DB.

Each divided protective electrode must receive a stable potential such as GND potential. As for supply of a potential to the protective electrode 30, four examples will be described below. Note that each example can also be applied to an X-ray flat panel detector according to any one of the following embodiments.

Example 1-1

An X-ray flat panel detector according to Example 1-1 will be explained.

Figure 5:
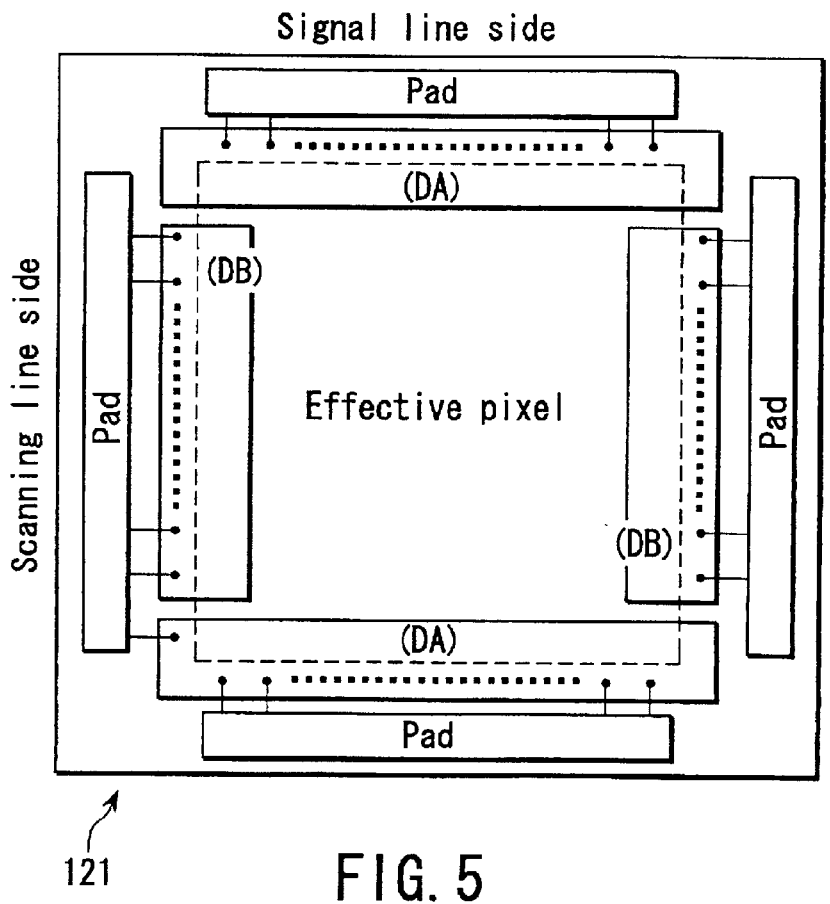
FIG. 5 is a plan view for explaining an example of potential supply to the protective electrode 30.

FIG. 5 is a plan view for explaining an X-ray flat panel detector 121 according to Example 1-1. In the X-ray flat panel detector 121 shown in FIG. 5, switching elements are driven from the two sides, and signals are read out from pixels from two, upper and lower sides. A scanning line extending from each sensor element of the sensor element array is extracted on the right or left side of the sensor element array. A signal line extending from each sensor element of the sensor element array is extracted on the upper or lower side of the sensor element array.

The gate scanning line driving circuits 18 arranged on the two, right and left sides of the sensor element array have ICs which are connected to the scanning lines and drive the switching elements. In the X-ray flat panel detector 121, the ICs have a function of supplying potentials to the protective electrode, and supply GND potential at several points from respective sides. The arrangement of potential supply to the protective electrode is not limited to this. A contact portion for supplying GND potential at several points may be arranged separately from the ICs.

The integrating amplifier circuits 20 arranged on the upper and lower sides of the sensor element array in the row direction have amplifier ICs connected to the respective signal lines. In the X-ray flat panel detector 121, these ICs have a function of supplying potentials to the protective electrode, and supply potentials at several points from respective sides. Similar to the gate scanning line driving circuit 18, potential supply to the protective electrode may be achieved by supplying GND potential at several points, separately from the ICs.

Example 1-2

Figure 6:
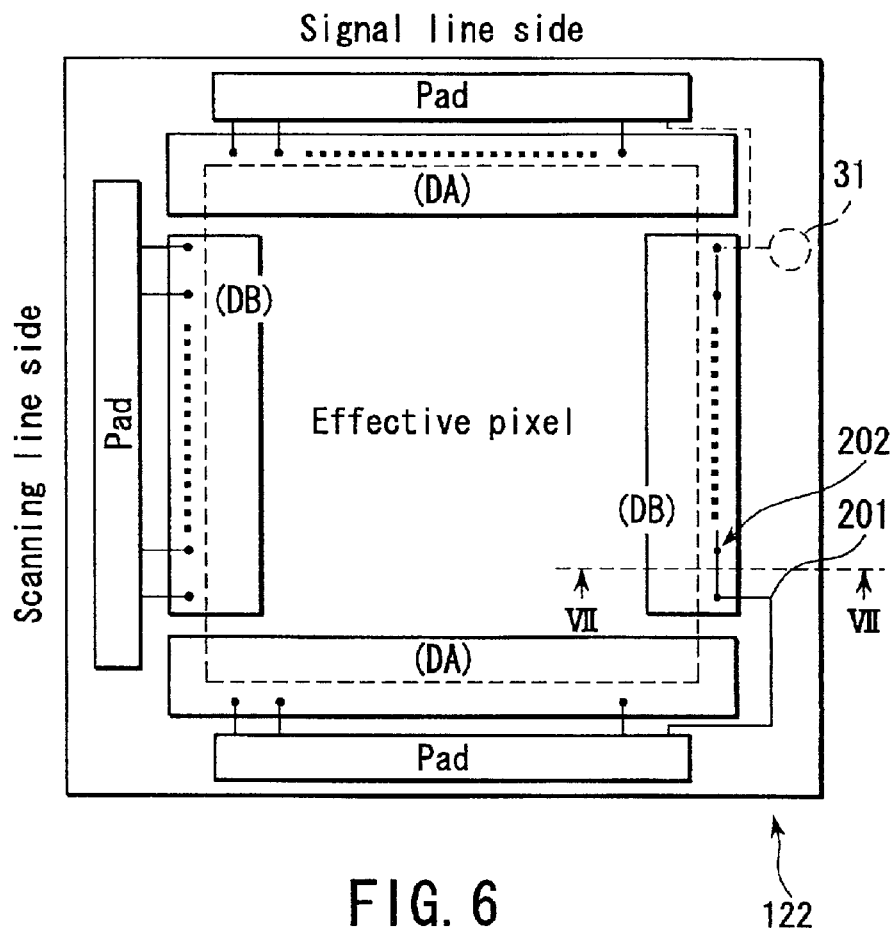
FIG. 6 is a plan view for explaining another example of potential supply to the protective electrode 30.

FIG. 6 is a plan view for explaining an X-ray flat panel detector 122 according to Example 1-2. In the X-ray flat panel detector 122 shown in FIG. 6, switching elements are driven from the right or left side of the sensor element array, and signals are read out from pixels from the upper and lower sides of the sensor element array. The X-ray flat panel detector 122 comprises the gate scanning line driving circuit 18 arranged on either one of the right and left sides of the sensor element array, and the integrating amplifier circuits 20 and A/D converters which are arranged on the upper and lower sides of the sensor element array.

The gate scanning line driving circuit 18 arranged on either one of the right and left sides of the sensor element array has a scanning line driving IC which is connected to each scanning line and has a function of supplying a potential to the protective electrode. The arrangement of potential supply to the protective electrode is not limited to this. An arrangement for supplying GND potential by supply line 200 at several points may be arranged separately from the IC. A side not connected to the scanning line driving IC receives GND potential at one or two points from the signal line side. In this case, the protective electrode has a resistance component, the GND stability degrades, and an output difference occurs between the right and left sides of the dummy pixel (DB). To prevent generation of the output difference, a low-resistance material is preferably applied below the protective electrode and brought into contact with the protective electrode at several points, thereby enhancing GND.

Figure 7:
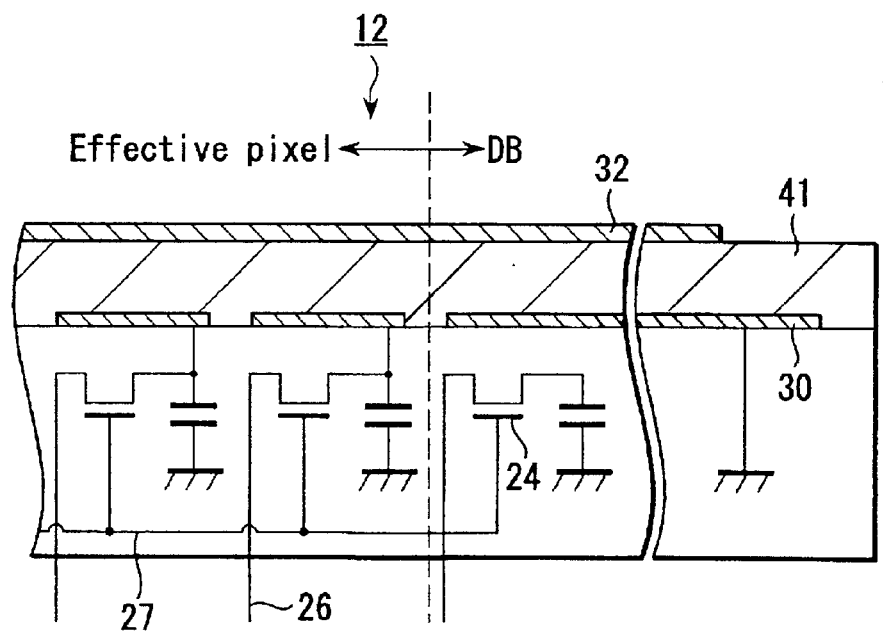
FIG. 7 is a sectional view for explaining the example of potential supply to the protective electrode 30 in FIG. 6.

FIG. 7 is a sectional view taken along the line E—E in FIG. 6. As shown in FIG. 7, the low-resistance material 202 may also be applied below the protective electrode on a side connected to the scanning line driving IC in order to eliminate the output difference between the right and left sides of the dummy pixel (DB). Alternatively, a portion 31 where GND potential can be supplied may be set on a side not connected to the scanning line driving IC so as to supply GND potential.

On the signal line side, GND potential can be supplied to the protective electrode by the potential supply function described in Example 1-1.

Example 1-3

Figure 8:
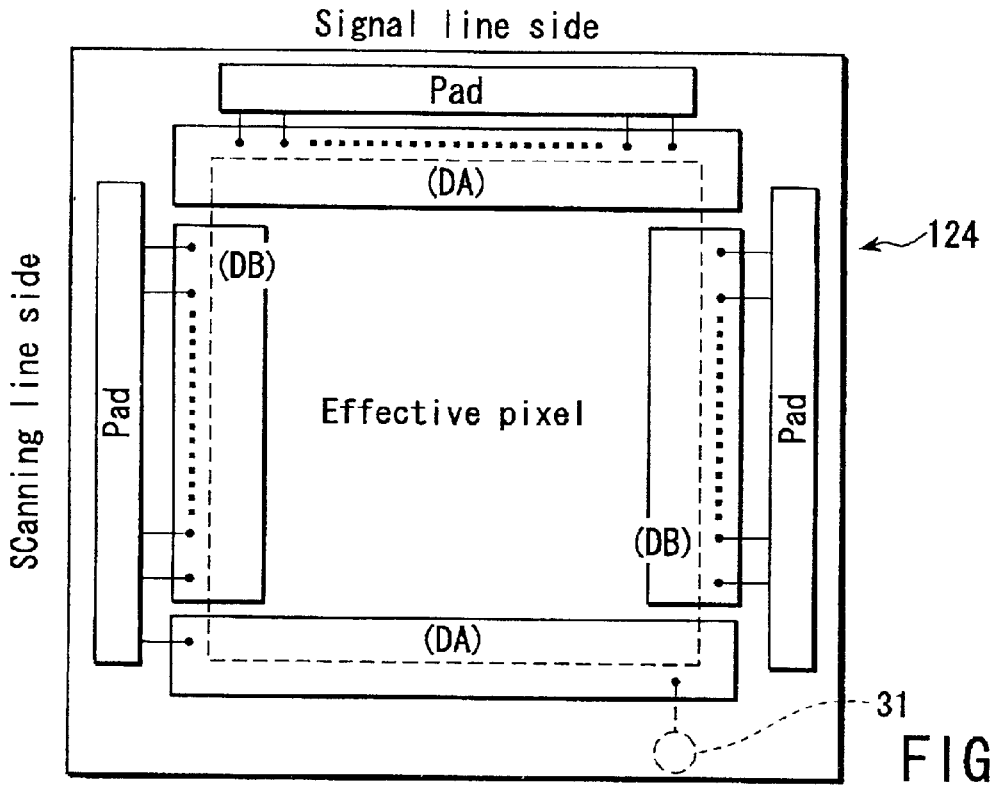
FIG. 8 is a plan view for explaining still another example of potential supply to the protective electrode 30.

FIG. 8 is a plan view for explaining an X-ray flat panel detector 124 according to Example 1-3. In the X-ray flat panel detector 124 shown in FIG. 8, switching elements are driven from the right and left sides of the sensor element array, and signals are read out from pixels from the upper or lower side of the sensor element array. The X-ray flat panel detector 124 comprises the gate scanning line driving circuits 18 arranged on the two, right and left sides of the sensor element array, and the integrating amplifier circuit 20 and A/D converter which are arranged on the upper or lower side of the sensor element array.

On the scanning line side, GND potential can be supplied to the protective electrode by the potential supply function described in Example 1-1.

On the signal line side, similar to Example 1-1, the amplifier IC within the integrating amplifier circuit 20 connected to the respective signal lines 26 has a function of supplying a potential to the protective electrode, and supplies potentials at several points from respective sides. A signal line side not connected to the amplifier IC receives GND potential at one or two points from the scanning line side. Similar to the gate scanning line driving circuit 18, potential supply to the protective electrode may be accomplished by supplying GND potential at several points, separately from the IC. Alternatively, a contact portion (e.g., pads) capable of supplying GND potential from a signal line side not connected to the amplifier IC to a signal line side not connected to the amplifier IC may be employed.

Example 1-4

Figure 9:
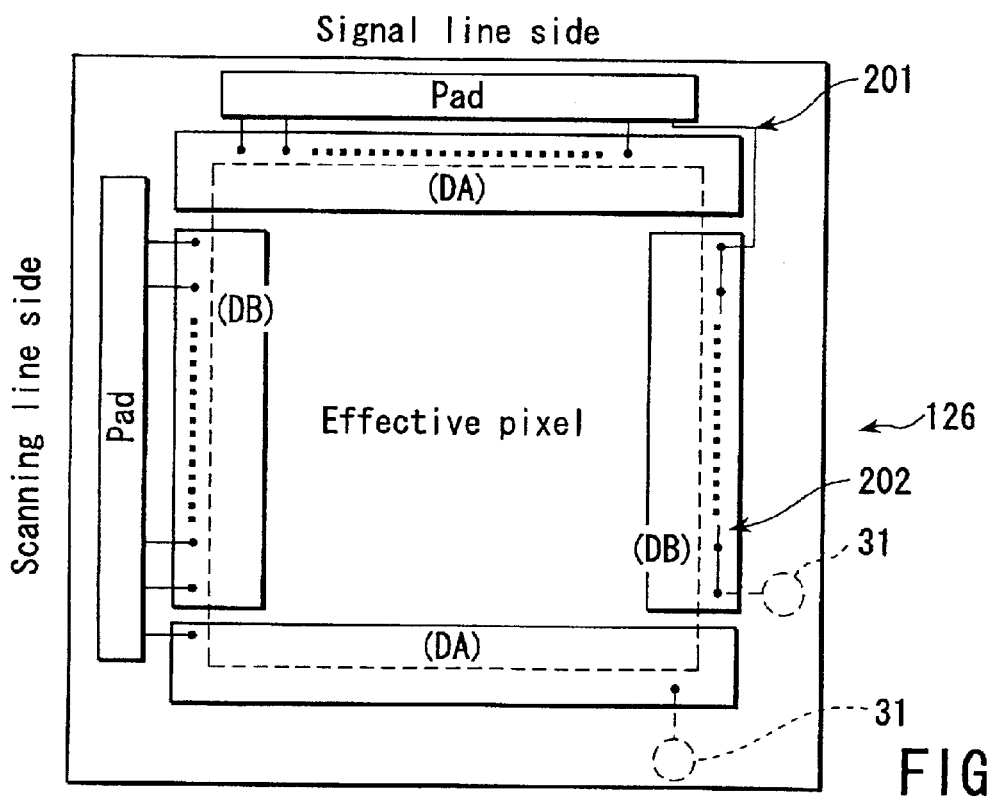
FIG. 9 is a plan view for explaining still another example of potential supply to the protective electrode 30.

FIG. 9 is a plan view for explaining an X-ray flat panel detector 126 according to Example 1-4. In the X-ray flat panel detector 126 shown in FIG. 9, switching elements are driven from the right or left sides of the sensor element array, and signals are read out from pixels from the upper or lower side of the sensor element array. The X-ray flat panel detector 126 comprises the gate scanning line driving circuit 18 arranged on the right or left side of the sensor element array, and the integrating amplifier circuit 20 and A/D converter which are arranged on the upper or lower side of the sensor element array.

On the scanning line side, GND potential can be supplied to the protective electrode by the potential supply function described in Example 1-2.

On the signal line side, GND potential can be supplied to the protective electrode by the potential supply function described in Example 1-3.

In the above-described arrangements, the protective electrode 30 is divided between the dummy pixel A area and the dummy pixel B area. The signal line 26 connected to the DB is not influenced by potential variations caused by DA driving. Hence, noise can be properly corrected by the DB, and a low-noise, high-quality X-ray diagnostic image can be acquired.

An LC wiring line 291 is also divided between the dummy pixel A area and the dummy pixel B area. The output of the effective pixel is not influenced by fluctuations in the scanning line potential of the DA in a steady state. The noise generation cause (conductive path) itself can be eliminated, and a low-noise, high-quality X-ray diagnostic image can be obtained.

The LC wiring line 291 has an auxiliary wiring line 295 which is to be disconnected between the dummy pixel A area and the dummy pixel B area. This disconnection can be easily executed even upon the completion of the X-ray flat panel detector 12.

Second Embodiment

The second embodiment will describe an X-ray flat panel detector having an arrangement in which a protective electrode 30 does not form any capacitance together with a signal line 26 or scanning line 27.

Figure 10:
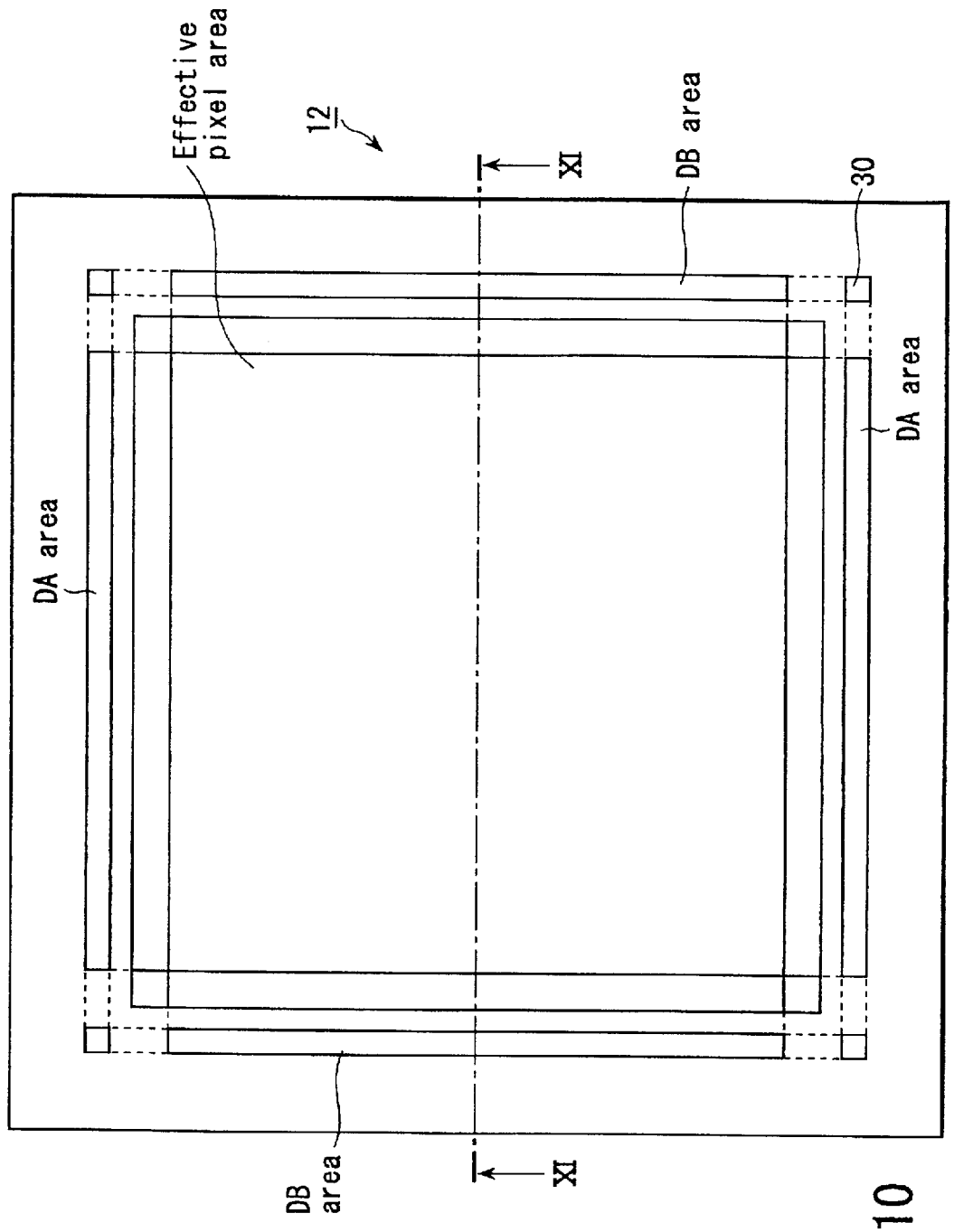
FIG. 10 is a plan view for explaining the arrangement of an X-ray flat panel detector 12 according to the second embodiment.
Figure 11:
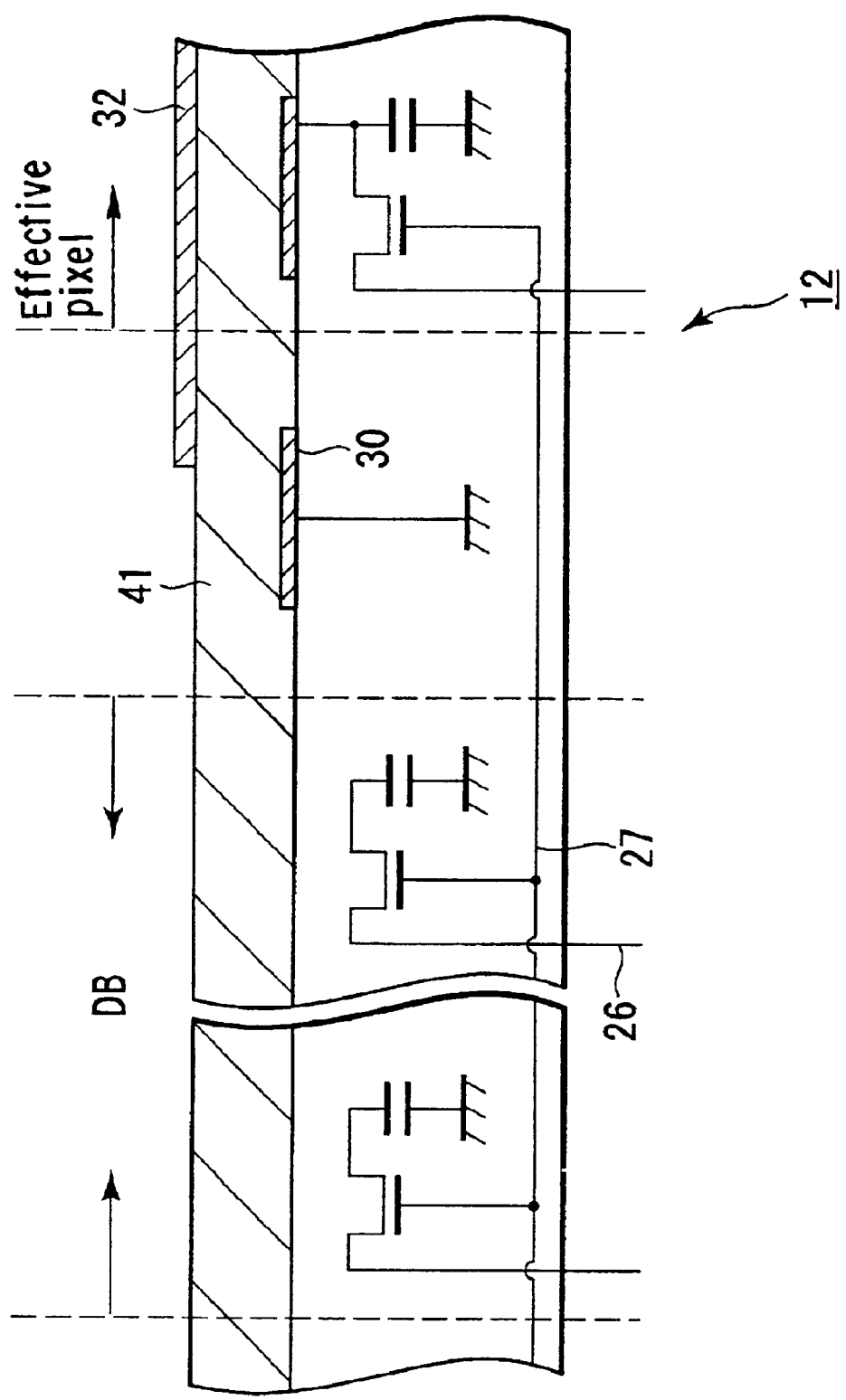
FIG. 11 is a sectional view taken along the line P—P in FIG. 10.

FIG. 10 is a plan view for explaining the arrangement of an X-ray flat panel detector 12 according to the second embodiment. FIG. 11 is a sectional view taken along the line P—P in FIG. 10. As shown in FIGS. 10 and 11, the X-ray flat panel detector 12 does not exist on a DA or DB. With this arrangement, the protective electrode 30 does not form capacitances together with the signal line 26 and scanning line 27.

Even if a gate scanning line driving circuit 18 drives the DA and the potential of the protective electrode 30 becomes unstable, the unstable potential of the protective electrode 30 is not transferred to the signal line of the DB. For example, even in dark imaging, the output values of the effective pixel and dummy pixel do not differ from each other, and generation of noise can be prevented.

Two modifications of the X-ray flat panel detector 12 according to the second embodiment will be explained. The X-ray flat panel detector according to each modification has a protective electrode 30 disconnected at at least one portion in terms of removal of a loop current flowing through the protective electrode 30.

Figure 12:
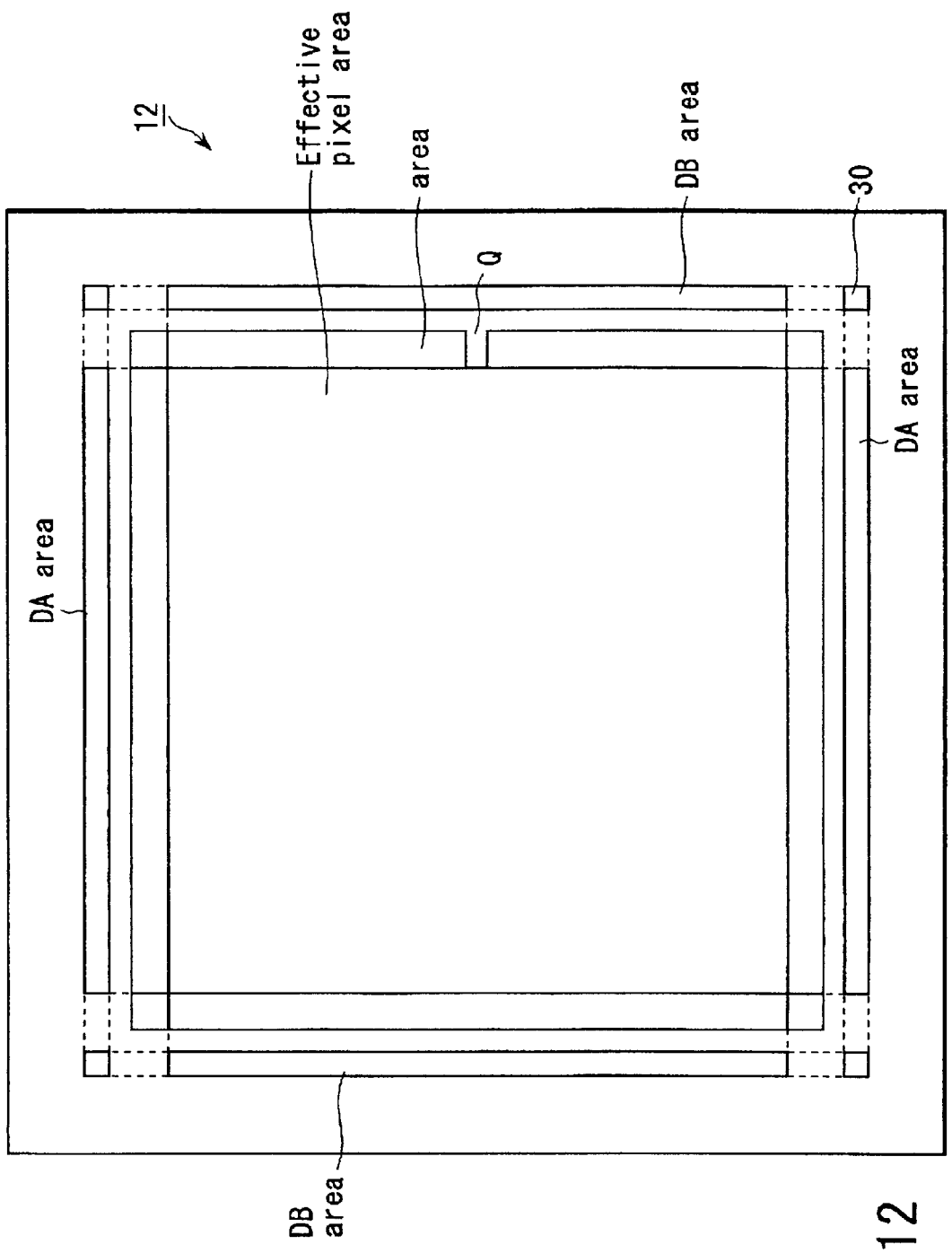
FIG. 12 is a plan view showing an X-ray flat panel detector 12 having a C type protective electrode 30.

FIG. 12 is a plan view showing an X-ray flat panel detector 12 having a C type protective electrode 30 disconnected at a position Q. In the X-ray flat panel detector 12 according to this modification, the protective electrode 30 does not form any circuit. The protective electrode 30 can disconnect the path of a loop current generated upon, e.g., driving the detector 12.

Figure 13:
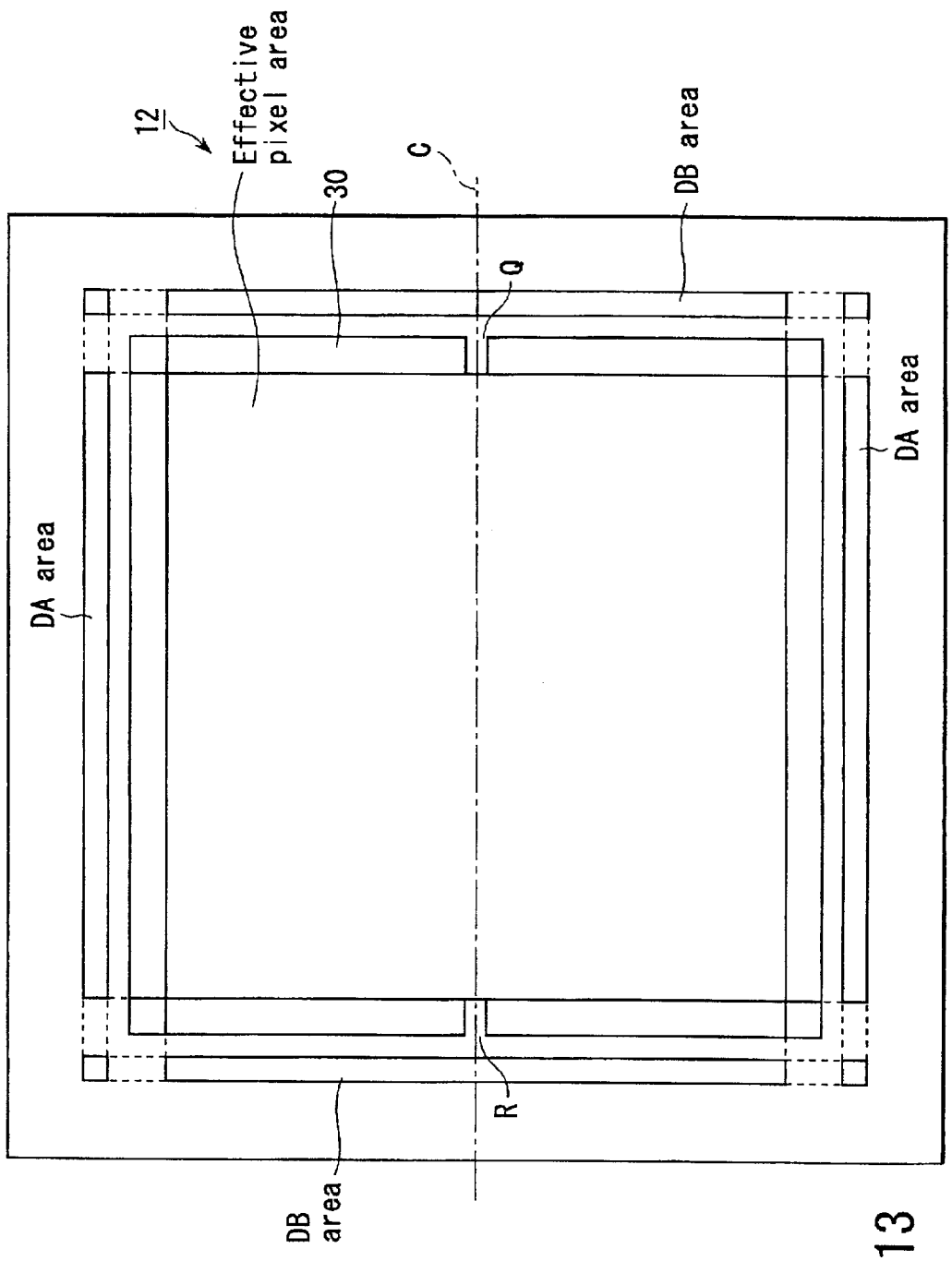
FIG. 13 is a plan view for explaining a protective electrode 30 which is axially symmetrical about the central axis of the X-ray flat panel detector 12.

FIG. 13 is a plan view showing an X-ray flat panel detector 12 having a protective electrode 30 disconnected at positions Q and R. Particularly in the modification of FIG. 13, the protective electrode 30 is axially symmetrical about the central axis of the X-ray flat panel detector 12. This protective electrode 30 copes with an array of X-ray sensor elements 16 which are arranged axially symmetrical about the central axis of the X-ray flat panel detector 12. If the protective electrode 30 is axially symmetrical about the central axis of the X-ray flat panel detector 12, similar to an array of the X-ray sensor elements 16, noise superposed on an image can be efficiently canceled using this symmetry.

Third Embodiment

Generally in the TFT array manufacturing step and detector assembly step in the manufacture of an X-ray flat panel detector, scanning lines and signal lines are electrostatically charged. If the electrostatic charging amount increases, dielectric breakdown may occur between the scanning line, the signal line, and a conductor on the same layer as that of the scanning line or the like or on another layer. The third embodiment will exemplify an X-ray flat panel detector which has a function of preventing dielectric breakdown caused by static electricity, and even if a dummy pixel is driven, does not influence the potential of the scanning line of each effective pixel.

An X-ray flat panel detector 12 according to the third embodiment prevents such dielectric breakdown by a dielectric breakdown preventing section 29 as shown in FIG. 1. The dielectric breakdown preventing section 29 is constituted by bidirectional diodes 290 connected to scanning lines 27 and signal lines 26 outside all the pixel areas (effective pixel area, dummy pixel A area, and dummy pixel B area), and LC wiring lines 291 which are combined into one line and laid out around the pixel area while one of the electrodes of each LC wiring line 291 is connected to a corresponding diode 290. When scanning lines irrelevant to driving of switching elements or signal lines irrelevant to read of a signal from each pixel exist, these scanning lines or signal lines are also preferably connected to the diodes 290.

The LC wiring line 291 of the X-ray flat panel detector 12 according to the third embodiment is disconnected at a predetermined position and separated from the scanning line side and signal line side. As for disconnection of the LC wiring line 291, the following five examples will be described. Note that each example can also be applied to an X-ray flat panel detector according to any one of the above-described embodiments.

Example 3-1

Figure 14:
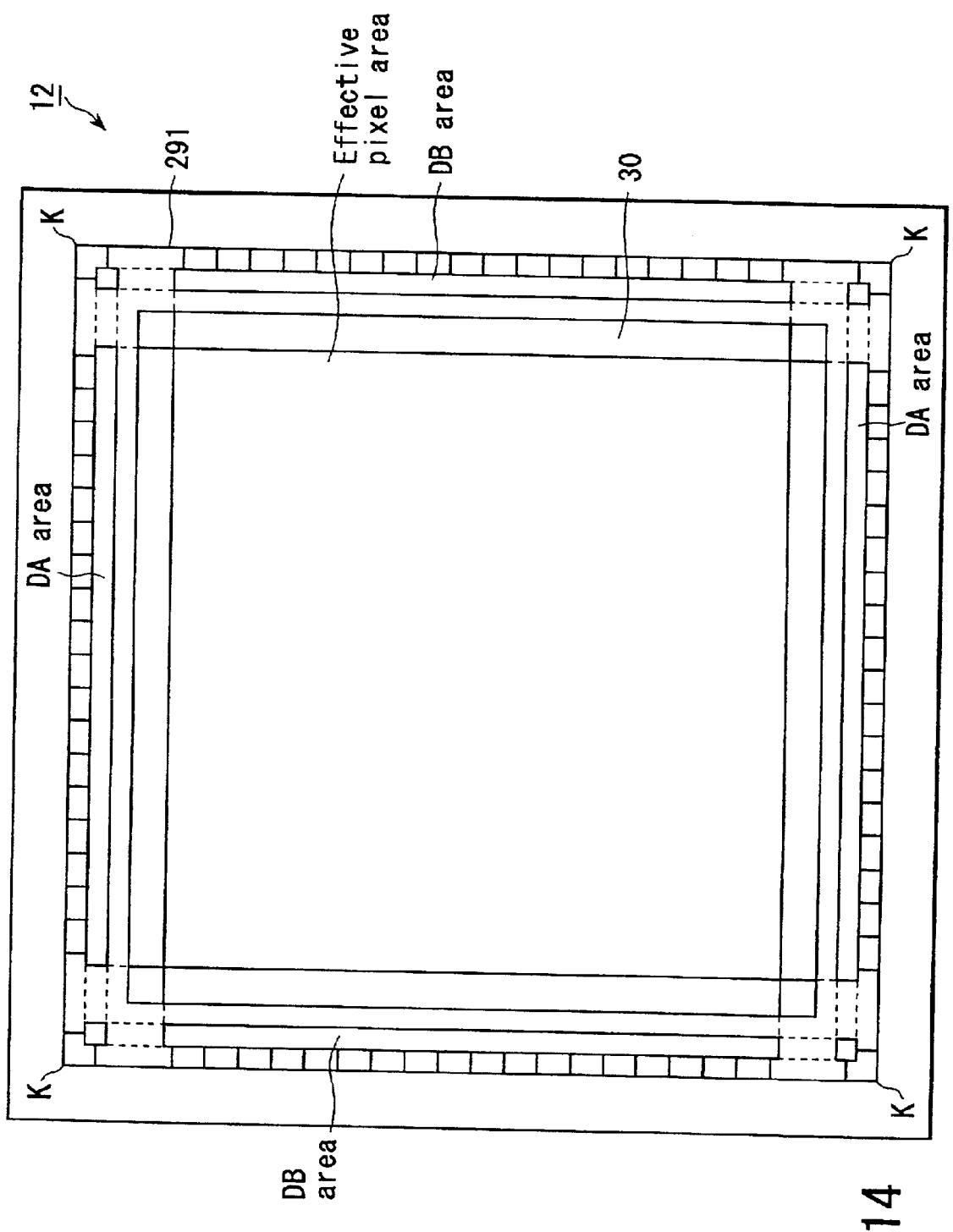
FIG. 14 is a plan view for explaining an example of an LC wiring line 291 of the X-ray flat panel detector 12.

FIG. 14 is a plan view for explaining disconnection of the LC wiring line 291 of the X-ray flat panel detector 12 according to Example 3-1. As shown in FIG. 14, the X-ray flat panel detector 12 has a second DA 296 for removing noise of a DB, and the LC wiring line 291 disconnected between the scanning line side and signal line side at positions K. Each cutoff LC wiring line 291 receives a potential (e.g., OFF potential of the scanning line or signal line potential) which does not influence the array function.

In the dielectric breakdown preventing section 29, charges accumulated in the scanning line or signal line are distributed by the diode 290 to the LC wiring line 291. This can prevent dielectric breakdown caused by static electricity in the manufacturing process. The LC wiring line 291 is disconnected between the scanning line side and signal line side at the positions K.

Example 3-2

Figure 15:
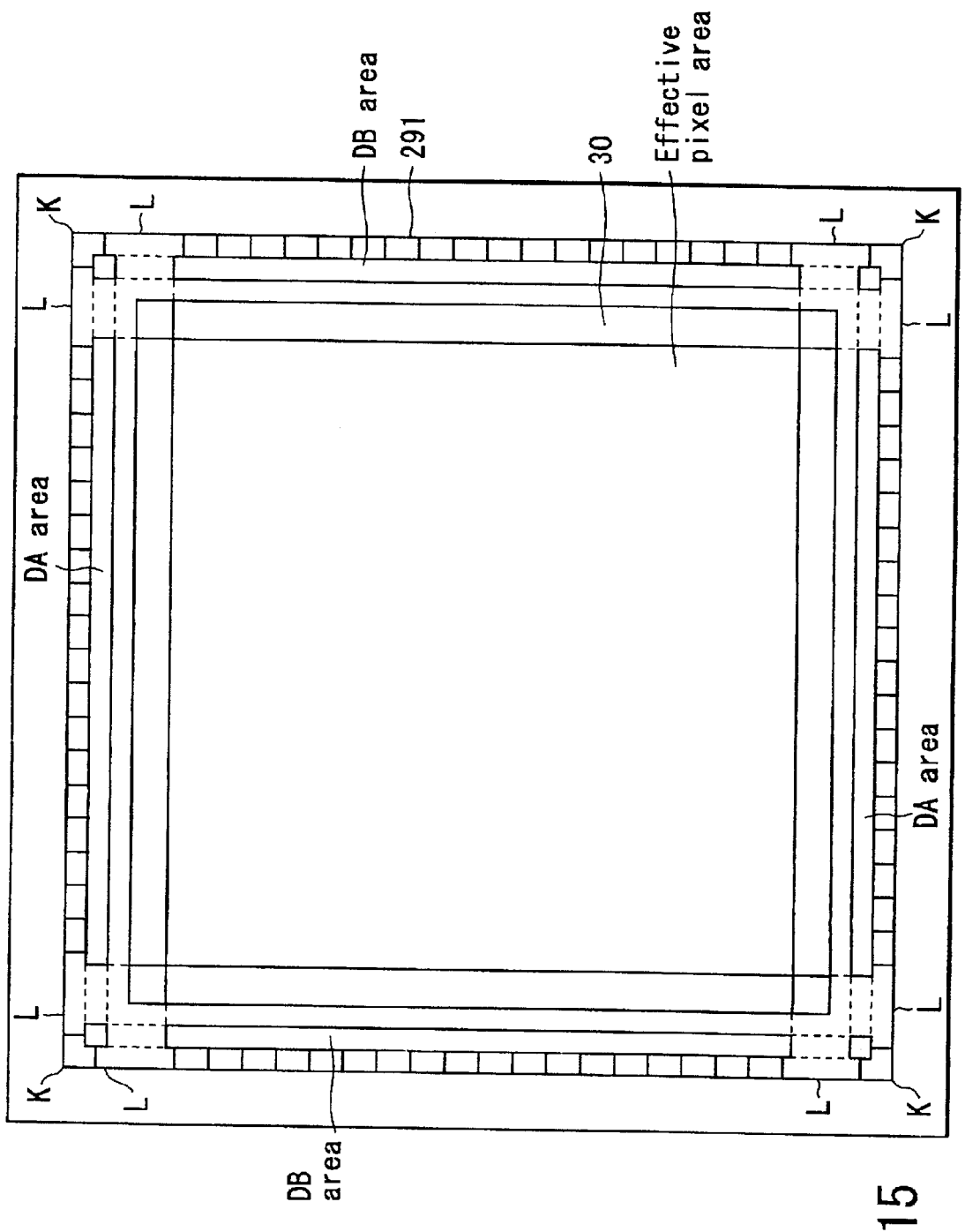
FIG. 15 is a plan view for explaining another example of the LC wiring line 291 of the X-ray flat panel detector 12.

FIG. 15 is a plan view for explaining disconnection of the LC wiring line 291 of the X-ray flat panel detector 12 according to Example 3-2. As shown in FIG. 15, the X-ray flat panel detector 12 has the LC wiring line 291 which is disconnected at positions K serving as the boundaries between the scanning line sides and the signal line sides and at positions L serving as the boundaries between the dummy pixel A areas and the dummy pixel B areas. In this way, the LC wiring line 291 is also disconnected at the positions L in order to completely separate the LC wiring line 291 connected to the DA from the LC wiring line 291 connected to the effective pixel, and to prevent the influence of fluctuations in the scanning line potential of the DA in a steady state on the output of the effective pixel.

When the DA is actually driven using the X-ray flat panel detector 12, potential fluctuations by this driving are considered to influence the scanning line potential of the effective pixel through a path: scanning line (dummy pixel (DA))→the dummy pixel (DA)→wiring line (LC)→the effective pixel→scanning line (effective pixel). The fluctuation component of the DA is superposed on the potential of each scanning line, increasing noise (NB). However, the X-ray flat panel detector 12 has divided LC wiring lines, so potential fluctuations in a scanning line connected to the DA do not influence the potential of a scanning line connected to the effective pixel. This can reduce the noise component superposed on the scanning line connected to the effective pixel.

Figure 16:
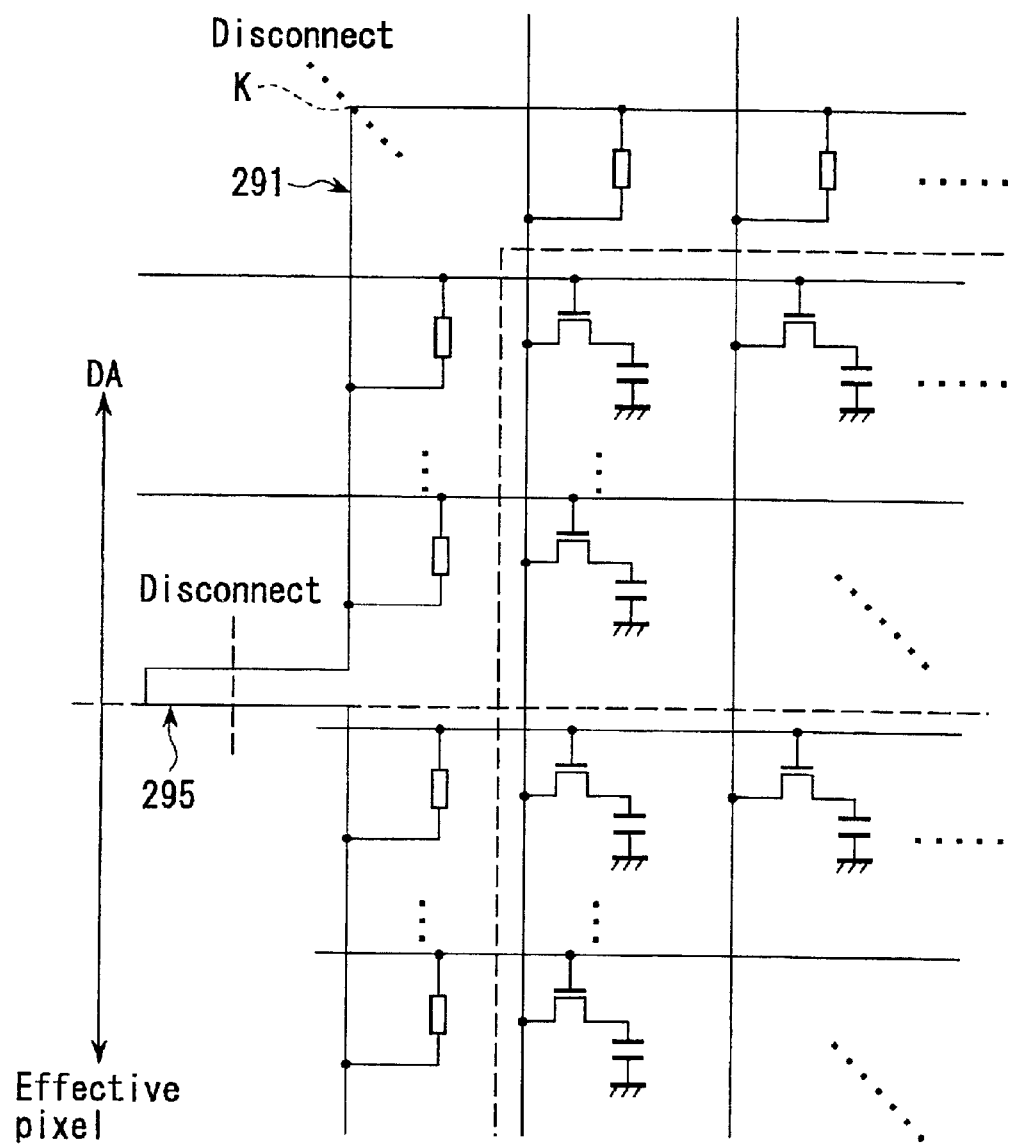
FIG. 16 is a circuit diagram for explaining an auxiliary wiring line 295 of the LC wiring line 291.

To easily disconnect the LC wiring line 291 at the position L, the LC wiring line 291 preferably has an auxiliary wiring line 295 for disconnection, as shown in FIG. 16. This arrangement facilitates disconnecting the LC wiring line 291 between the dummy pixel A area and the dummy pixel B area.

To easily disconnect the LC wiring line 291 at the position K, the LC wiring line 291 may have an auxiliary wiring line 295 for disconnection, similar to the position L.

Example 3-3

Figure 17:
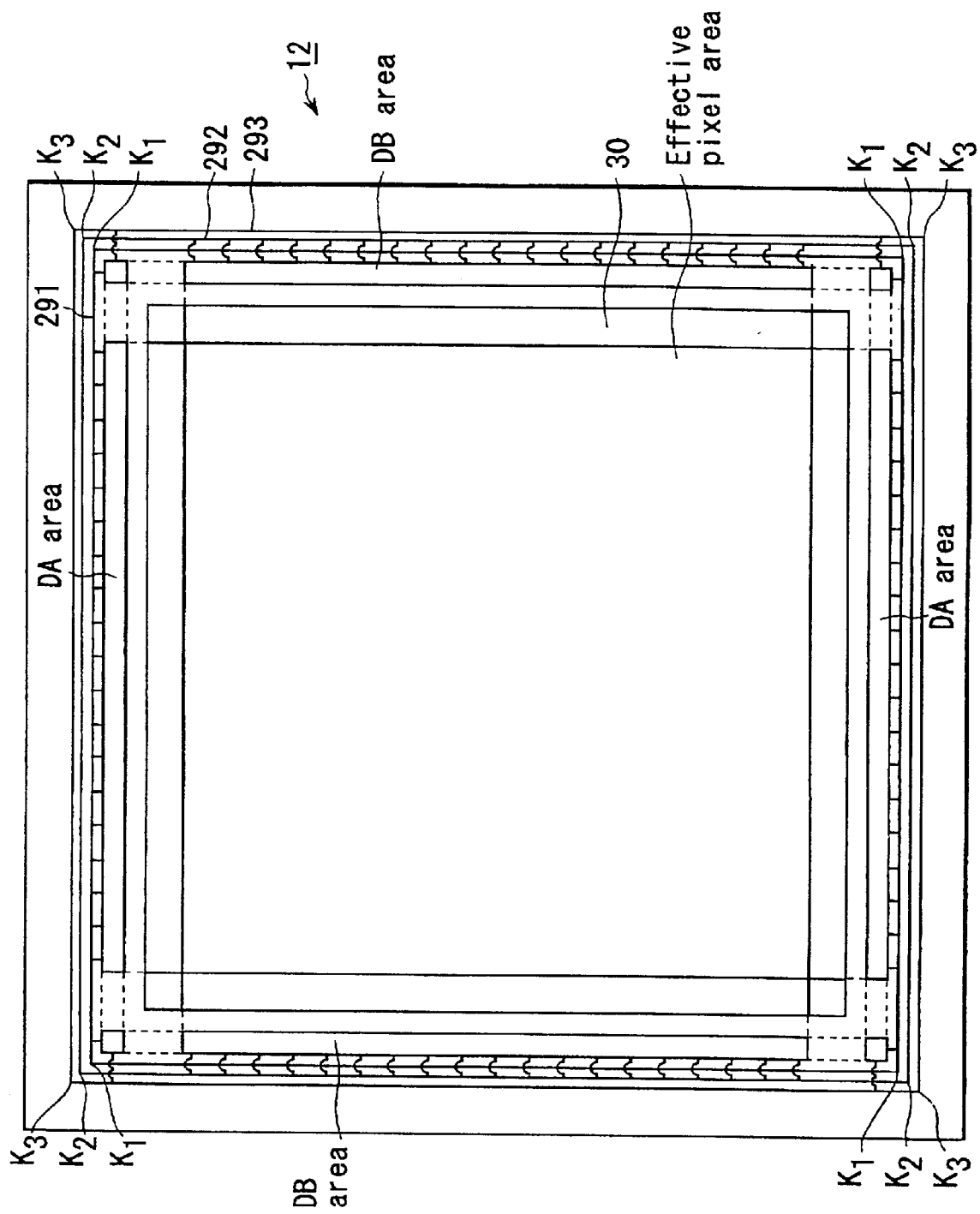
FIG. 17 is a plan view for explaining an example of the LC wiring structure of the X-ray flat panel detector 12.

FIG. 17 is a plan view for explaining the LC wiring structure of the X-ray flat panel detector 12 according to Example 3-3. As shown in FIG. 17, the X-ray flat panel detector 12 comprises a first LC wiring line 292, second LC wiring line 293, and third LC wiring line 294. The first LC wiring line 292 is connected to scanning lines connected to a DA and the second DA 296. The second LC wiring line 293 is connected to a signal line connected to a DB. The third LC wiring line 294 is connected to the signal line of the second DA 296.

The first, second, and third LC wiring lines 292, 293, and 294 are electrically separated from each other. Since the current path is disconnected, potential fluctuations by driving of the DA do not influence the potential of a scanning line connected to the effective pixel. As a result, the noise component superposed on the scanning line connected to the effective pixel can be reduced.

Note that each LC wiring line may be disconnected at positions serving as the boundaries between the scanning line sides and the signal line sides, i.e., positions K1, K2, and K3. The LC wiring line may also be disconnected at the positions L, as shown in FIG. 15. This also applies to the following Examples 3-4 and 3-5.

Example 3-4

Figure 18:
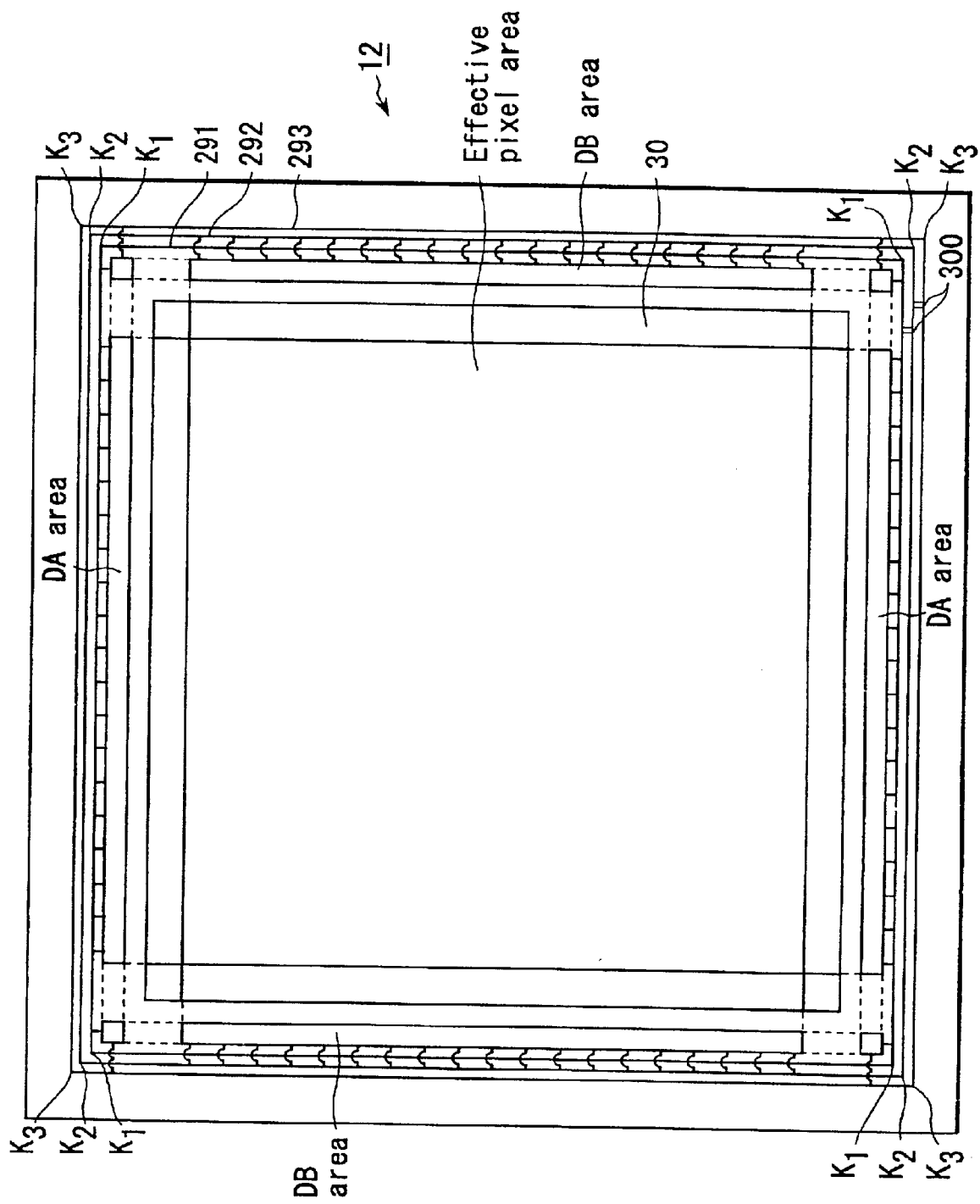
FIG. 18 is a plan view for explaining another example of the LC wiring structure of the X-ray flat panel detector 12.

FIG. 18 is a plan view for explaining the structure of the LC wiring line 291 of the X-ray flat panel detector 12 according to Example 3-4. The X-ray flat panel detector 12 shown in FIG. 18 has resistors 300 which connect the respective LC wiring lines, in addition to the first, second, and third LC wiring lines 292, 293, and 294. Each resistor 300 has a resistance value enough to prevent dielectric breakdown caused by static electricity.

The first, second, and third LC wiring lines 292, 293, and 294 are connected to each other via the resistors 300. This arrangement can further improve the dielectric breakdown preventing function in the manufacturing process or the like, compared to a case wherein the respective wiring lines are electrically disconnected completely. Since the respective LC wiring lines are connected via the resistors 300, the influence of driving of a DA on the potential of a scanning line connected to the effective pixel can be reduced. Consequently, the noise component superposed on the scanning line connected to the effective pixel can be reduced.

Example 3-5

Figure 19:
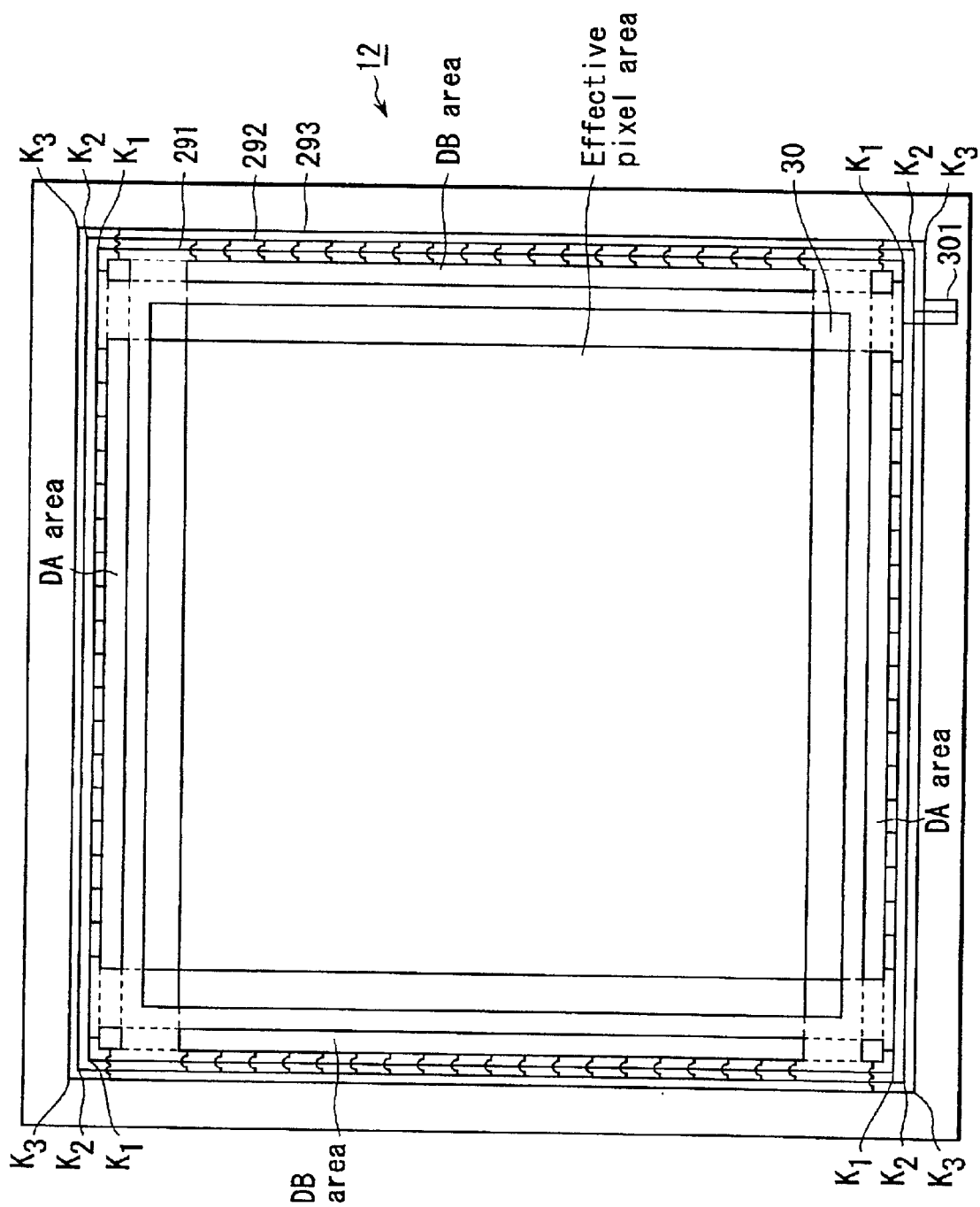
FIG. 19 is a plan view for explaining still another example of the LC wiring structure of the X-ray flat panel detector 12.

FIG. 19 is a plan view for explaining the structure of the LC wiring line 291 of the X-ray flat panel detector 12 according to Example 3-5. The X-ray flat panel detector 12 shown in FIG. 19 has auxiliary wiring lines 301 for disconnection that are connected to the respective LC wiring lines, in addition to the first, second, and third LC wiring lines 292, 293, and 294.

The first, second, and third LC wiring lines 292, 293, and 294 are connected to each other via the auxiliary wiring lines 301. The dielectric breakdown preventing function can be further improved in the manufacturing process or the like, compared to a case wherein the respective wiring lines are electrically disconnected completely. In actual use of the X-ray flat panel detector 12, the auxiliary wiring lines 301 are disconnected. Therefore, the current path is disconnected, and the respective LC wiring lines are electrically independent of each other. Potential fluctuations by driving of a DA do not propagate to a scanning line connected to the effective pixel. The noise component superposed on the scanning line connected to the effective pixel can be reduced.

The above-described embodiments can implement an X-ray flat panel detector capable of preventing dielectric breakdown and providing a high-quality X-ray diagnostic image free from any noise.

The present invention has been explained on the basis of the above embodiments. However, various changes and modifications will readily be made by those skilled in the art within the spirit and scope of the present invention. These changes and modifications are also incorporated in the present invention, and the present invention can be variously changed without departing from the spirit and scope of the present invention.

The embodiments include inventions on various stages, and various inventions can be extracted by an appropriate combination of building components disclosed. For example, even if several building components are omitted from all the building components described in the embodiments, the problems disclosed in "BACKGROUND OF THE INVENTION" may be solved, and at least one of the above-described effects may be obtained. In this case, an arrangement from which the building components are omitted can be extracted as an invention.

What is claimed is:

1. An X-ray flat panel detector comprising:
   an effective pixel array in which a plurality of pixel electrodes are arrayed in a matrix and accumulate charges;
   a photoconductor which covers said effective pixel array and generates charges on the basis of incident X-rays;
   a bias electrode which is formed on a second surface of said photoconductor, covers an area of said pixel electrodes, and applies a bias voltage between said photoconductor and said pixel electrodes;
   a plurality of signal lines to read out electronic signals from said effective pixel array;
   a plurality of scanning lines to scan said effective pixel array;
   first dummy pixels which are arranged adjacent to said effective pixel array and remove noise superposed on said plurality of signal lines;
   second dummy pixels which are arranged adjacent to said effective pixel array and remove noise superposed on said plurality of scanning lines;
   a first protective electrode which is arranged in correspondence with said first dummy pixels and electrically shields said bias electrode and said plurality of signal lines or said plurality of scanning lines; and
   a second protective electrode which is arranged in correspondence with said second dummy pixels, disconnected from said first protective electrode and electrically shields said bias electrode and said plurality of signal lines or said plurality of scanning lines.

2. The detector according to claim 1, further comprising a first pad to supply GND potential to said first protective electrode, and a second pad to supply GND potential to said second protective electrode.

3. The detector according to claim 1, wherein said first protective electrode receives GND potential of a driving circuit which drives said effective pixel array; and
   said second protective electrode receives GND potential of a read circuit which reads out an electrical signal from said effective pixel array via said signal line.

4. An X-ray flat panel detector comprising:
   an effective pixel array in which a plurality of pixel electrodes are arrayed in a matrix and accumulate charges;
   a photoconductor which covers said effective pixel array and generates charges on the basis of incident X-rays;
   a bias electrode which is formed on a second surface of said photoconductor, covers an area of said pixel electrodes, and applies a bias voltage between said photoconductor and said pixel electrodes;
   a plurality of signal lines to read out electronic signals from said effective pixel array;
   a plurality of scanning lines to scan said effective pixel array;
   a protective electrode which electrically shields said bias electrode and said plurality of signal lines or said plurality of scanning lines;
   first dummy pixels which are arranged around said protective electrode and remove noise superposed on said plurality of signal lines; and
   second dummy pixels which are arranged around said protective electrode and remove noise superposed on said plurality of scanning lines.

5. The detector according to claim 4, wherein said protective electrode is disconnected at at least one portion.

6. The detector according to claim 4, wherein said protective electrode includes at least two protective electrodes.

7. The detector according to claim 4, wherein said protective electrode has first and second protective electrode portions which are arranged axially symmetrically about said signal line or said scanning line.

8. The detector according to claim 4, further comprising a pad to supply GND potential to said protective electrode.

9. The detector according to claim 4, wherein said protective electrode receives GND potential of a driving circuit which drives said effective pixel array.

10. The detector according to claim 4, wherein said protective electrode receives GND potential of a read circuit which reads out an electrical signal from said effective pixel array via said signal line.

11. An X-ray flat panel detector comprising:
    an effective pixel array in which a plurality of pixel electrodes are arrayed in a matrix and accumulate charges;
    a photoconductor which covers said effective pixel array and generates charges on the basis of incident X-rays;
    a plurality of first signal lines to read out electronic signals from said effective pixel array;
    a plurality of first scanning lines to scan said effective pixel array; and
    an electrostatic dispersion wiring line which is connected directly or via a nonlinear element to at least one of said plurality of first signal lines and at least one of said plurality of first scanning lines, and distributes static electricity accumulated in at least one of said plurality of first signal lines or said plurality of first scanning lines,
    wherein said electrostatic dispersion wiring line has a first auxiliary wiring line to disconnect said electrostatic dispersion wiring line between a connecting portion between said electrostatic dispersion wiring line and at least one of said plurality of first signal lines and a connecting portion between said electrostatic dispersion wiring line and at least one of said first scanning lines.

12. The detector according to claim 11, which further comprises first dummy pixels which remove noise superposed on said plurality of signal lines, second dummy pixels which remove noise superposed on said plurality of scanning lines, a second signal line to read out electronic signals from said first and second dummy pixels, and a second scanning line to scan said first and second dummy pixels; and in which said electrostatic dispersion wiring line is connected directly or via a nonlinear element to at least one of said plurality of first signal lines, said second signal line, at least one of said plurality of first scanning lines, and said second scanning line, and has a second auxiliary wiring line to disconnect said electrostatic dispersion wiring line between a connecting portion between a connecting portion between said electrostatic dispersion wiring line and at least one of said plurality of first signal lines and a connecting portion between said electrostatic dispersion wiring line and said second signal line, or between a connecting line between said electrostatic dispersion wiring line and at least one of said plurality of first scanning lines and a connecting portion between said electrostatic dispersion wiring line and said second scanning line.

13. The detector according to claim 11, which further comprises first dummy pixels which remove noise superposed on said plurality of signal lines, second dummy pixels which remove noise superposed on said plurality of scanning lines, a plurality of second signal lines to read out electronic signals from said first dummy pixels, and second scanning lines to scan said second dummy pixels, and in which said electrostatic dispersion wiring line has a first wiring line which is connected to at least one of said plurality of first signal lines and at least one of said plurality of second signal lines, a second wiring line which is connected to at least one of said plurality of first scanning lines, and a third wiring line which is connected to at least one of said plurality of second scanning lines.

14. The detector according to claim 13, further comprising a resistor which connects said first, second, and third wiring lines.

15. The detector according to claim 14, wherein said resistor has a resistance value which prevents dielectric breakdown caused by static electricity accumulated in at least one of said plurality of first signal lines or said plurality of first scanning lines.

16. The detector according to claim 13, further comprising a third auxiliary wiring line which is connected to said first, second, and third wiring lines, and cuts off electrical connection between said wiring lines.

17. An X-ray flat panel detector comprising:

an effective pixel array in which a plurality of pixel electrodes are arrayed in a matrix and accumulate charges;

a photoconductor which covers said effective pixel array and generates charges on the basis of incident X-rays;

a plurality of first signal lines to read out electronic signals from said effective pixel array;

a plurality of first scanning lines to scan said effective pixel array;

an electrostatic dispersion wiring line which is connected directly or via a nonlinear element to at least one of said plurality of first signal lines and at least one of said plurality of first scanning lines, and distributes static electricity accumulated in at least one of said plurality of first signal lines or said plurality of first scanning lines;

first dummy pixels which remove noise superposed on said plurality of signal lines;

second dummy pixels which remove noise superposed on said plurality of scanning lines;

a plurality of second signal lines to read out electronic signals from said first dummy pixels; and second scanning lines to scan said second dummy pixels, wherein said electrostatic dispersion wiring line has
a first wiring line which is connected to at least one of said plurality of first signal lines and at least one of said plurality of second signal lines,
a second wiring line which is connected to at least one of said plurality of first scanning lines, and
a third wiring line which is connected to at least one of said plurality of second scanning lines.

18. The detector according to claim 17, further comprising a resistor which connects said first, second, and third wiring lines.

19. The detector according to claim 18, wherein said resistor has a resistance value which prevents dielectric breakdown caused by static electricity accumulated in at least one of said plurality of first signal lines or said plurality of first scanning lines.

20. The detector according to claim 17, further comprising a third auxiliary wiring line which is connected to said first, second, and third wiring lines, and cuts off electrical connection between said wiring lines.

* * * * *